(12) United States Patent
Homer et al.

(10) Patent No.: US 7,755,891 B2
(45) Date of Patent: Jul. 13, 2010

(54) NOTEBOOK COMPUTER WITH SUPPORT MEMBER

(75) Inventors: Steve Homer, Tomball, TX (US); Earl Moore, Cypress, TX (US); Ken Reddix, Spring, TX (US); Keith Sauer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 12/242,425

(22) Filed: Sep. 30, 2008

(65) Prior Publication Data

US 2009/0190305 A1 Jul. 30, 2009

Related U.S. Application Data

(60) Provisional application No. 61/024,751, filed on Jan. 30, 2008.

(51) Int. Cl.
*G06F 1/16* (2006.01)
(52) U.S. Cl. .................................. 361/679.55
(58) Field of Classification Search ............. 361/679.55
See application file for complete search history.

(56) References Cited

U.S. PATENT DOCUMENTS

| 4,813,542 | A | 3/1989 | Thompson et al. |
| 5,805,412 | A | 9/1998 | Yanagisawa |
| 5,909,357 | A | 6/1999 | Orr |
| 6,181,554 | B1 * | 1/2001 | Cipolla et al. .......... 361/679.46 |
| 6,282,084 | B1 * | 8/2001 | Goerdt et al. .......... 361/679.55 |
| 6,346,000 | B1 | 2/2002 | Orr |
| 6,356,440 | B2 * | 3/2002 | Selker ................... 361/679.55 |
| 6,963,485 | B2 * | 11/2005 | Hong .................... 361/679.55 |
| 7,196,901 | B2 * | 3/2007 | Maskatia et al. ....... 361/679.55 |
| 7,251,128 | B2 * | 7/2007 | Williams et al. ....... 361/679.55 |
| 7,256,986 | B2 * | 8/2007 | Williams et al. ....... 361/679.55 |
| 7,586,743 | B2 * | 9/2009 | Lin ....................... 361/679.55 |
| 7,599,181 | B2 * | 10/2009 | Chuang et al. ......... 361/679.55 |
| 2003/0079949 | A1 | 5/2003 | Harvey |
| 2004/0228087 | A1 | 11/2004 | Coglitore |
| 2008/0101003 | A1 * | 5/2008 | Lin ............................ 361/683 |

\* cited by examiner

*Primary Examiner*—Lisa Lea-Edmonds

(57) ABSTRACT

A notebook computer comprises a base casing, a display casing hingeably coupled to the base casing, and a plurality of support members disposed in each of said base casing and said display casing around a perimeter of the casings. When the display casing is closed, the support members in the display casing align with the support members in the support members in the base casing.

17 Claims, 2 Drawing Sheets

NOTEBOOK COMPUTER WITH SUPPORT MEMBER

CROSS REFERENCE TO RELATED APPLICATIONS

This application claims the benefit of provisional patent application Ser. No. 61/024,751, filed Jan. 30, 2008, titled "Notebook Computer With Support Member."

BACKGROUND

Notebook computers are easy and desirable to stack one on top of the other. For examples, schools may have numerous notebooks for the students. When not in use, it may be desirable to store the notebooks in a stacked arrangement. Unfortunately, the weight of the notebooks may damage the notebooks towards the bottom of the stack.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first member couples to a second member, the first member may directly contact the second member or connect to the second member through an intermediary structure.

DETAILED DESCRIPTION

Figure 1:
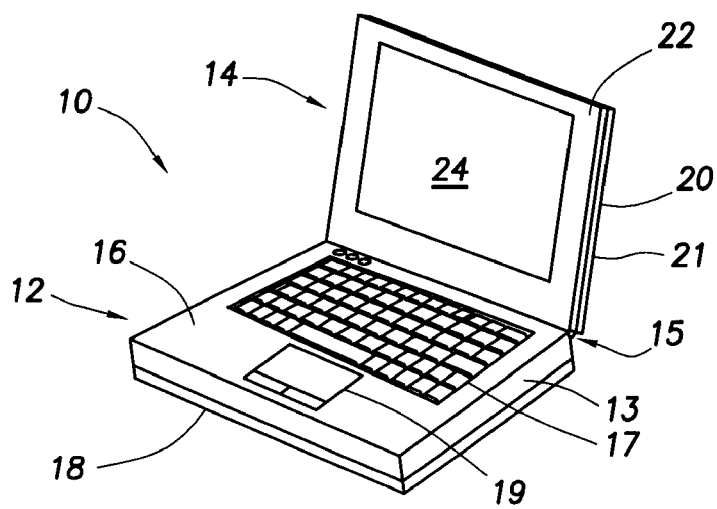
FIG. 1 shows a notebook computer with a display casing in an opened position in accordance with various embodiments.

FIG. 1 illustrates a notebook computer 10 (referred to as a "laptop" in other embodiments). The notebook computer 10 comprises a base unit 12 coupled to a display unit 14 by way of a hinge 15. The base unit 12 is thus hingeably coupled to the display unit 14. The hinge 15 enables the display unit 14 to be opened (as illustrated in FIG. 1) or closed.

The base unit 12 comprises a base casing 13 containing the electronics of the computer. The electronics include, for example, a processor, memory, etc. Such electronics are provided on a circuit board ("system" or "mother" board) contained within the base casing 13. In at least some embodiments, the base casing 13 comprises two portions mated together. As shown in FIG. 1, the base casing 13 comprises a top portion 16 attached to a bottom portion 18 by way of screws or other attachment mechanisms. The base casing 13 may be made from plastic or other suitable type of material. A keyboard 17 and touchpad 19 are also shown provided in the base casing 13.

The display unit 14 also comprises a casing 21 (referred to herein as the "display casing"). The display casing 21 may be made from metal, plastic or other suitable material. In some embodiments, the display casing 21 comprises two portions—a top portion 20 and a bottom portion 22. The top and bottom portions 20, 22 are joined together by way of screws or other attachment mechanisms. The display casing 21 contains a display 24 as shown.

Figure 2:
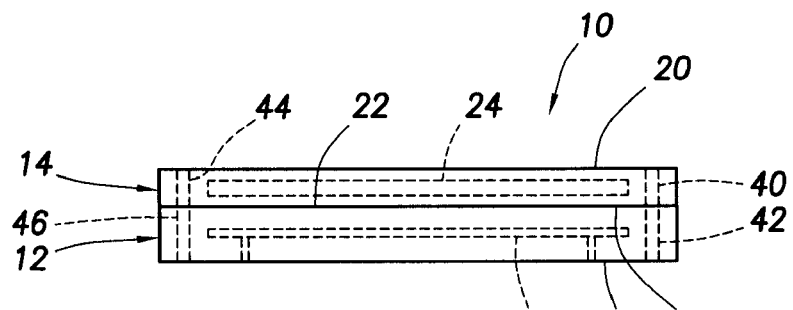
FIG. 2 shows a front plan view of the notebook computer of FIG. 1 with the display casing in a closed position.

FIG. 2 illustrates a front view of the notebook computer 10 with the display unit 14 in a closed position. While in the closed position, a portion of the display casing 21 contacts a portion of the base casing 13. Such portions are generally the outer perimeter of the casings. FIG. 2 also illustrates a circuit board 30 contained in the base casing 13 and the display 24 contained in the display casing 21. In accordance with various embodiments, one or more support members 40, 42, 44, and 46 are provided in the base and display casings 13, 21 to provide structural support to the casings to thereby enable increased weight to be placed on the notebook computer 10 while in the closed position. As such, more notebook computers 10 can be stacked one on top of the other without damaging the computers on the bottom of the stack than would be possible without the support members. As shown in FIG. 2, support members 40 and 44 are provided within the display unit 14 between the top and bottom portions 20 and 22. Each support member 40, 44 extends from, and thus contacts, top and bottom portions 20, 22 of the display unit 14. Similarly, support members 42 and 46 are provided within the base unit 12 between the top and bottom portions 16 and 18. Each support member 42, 46 extends from, and thus contacts, top and bottom portions 16, 18 of the base unit 12.

Figure 3:
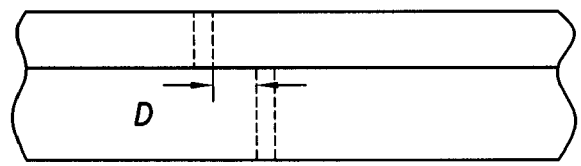
FIG. 3 illustrates two support members that are substantially aligned.

The location of each support member within its respective casing 13, 21 is such that, when the notebook computer is in the closed position, each display casing support member is in substantial alignment with a corresponding support member in the base casing 13. By way of example, support members 40 and 42 are in alignment and so are support members 44 and 46. By locating the support members within the casings so that they align when the computer is closed, a substantial portion of the weight placed on the computer will be transmitted through the casings by way of the support members. In this disclosure, "substantial alignment" of a pair of support members means that such support members are, as illustrated in FIG. 3, within, for example, 0.25 inches of each other as measured in the lateral direction shown.

The support members 40-46 may comprise posts made from metal, plastic, or other suitable material. In various embodiments, each post is substantially circular in cross-section. The support members may be formed as part of the casing themselves are may be separate components inserted into the casings.

Figure 4:
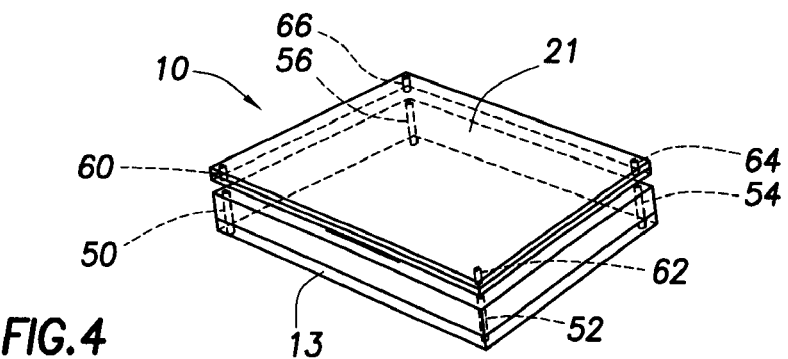
FIG. 4 illustrates a perspective view of the notebook computer in accordance with various embodiments.

FIG. 4 shows a perspective view of the notebook computer 10 in the closed position, but in an exploded view. Each of the base and display casings 13, 21 contains a support member at or near each of the four corners. Base casing 13 contains support members 50, 52, 54, and 56, while display casing 21 contains corresponding support members 60, 62, 64, and 66 in substantial alignment with the base casing support members as shown. The number and locations of the support members can be different in other embodiments. In some embodiments, all of the support members are substantially identical in their cross-sectional shape (e.g., circular).

Figure 5:
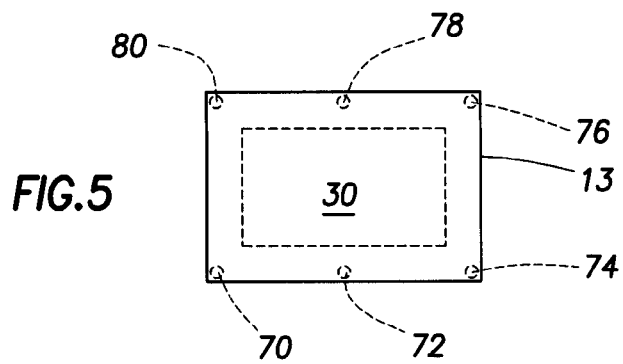
FIG. 5 shows a top view of the notebook computer illustrating various support members in accordance with various embodiments.

FIG. 5 shows a top view of the one of base casing 13. The circuit board 30 is shown in dashed outline. Support members 70-80 are located around the perimeter of the casing 13 and outside the footprint of the circuit board 30. FIG. 5 illustrates that support members can be placed at each of the four corners and/or along any of the sides of the casing. A similar arrangement of support members can be also be implemented in the display casing 21.

Figure 6:
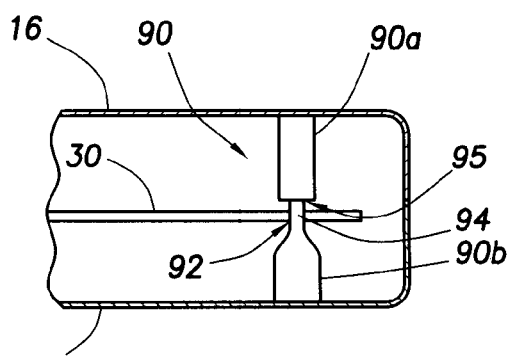
FIG. 6 illustrates an alternative embodiment of a support member.

FIG. 6 shows an alternative embodiment of a support member contained in the base casing 13. In the embodiment of FIG. 6, the support member is designated by reference numeral 90. Support member 90 comprises an upper post 90a that extends down from the upper portion 16 of the casing 13 and a lower post 90b that extends up from the lower portion 18 of the casing. The two support member posts 90a and 90b contact each other at 95. This embodiment is useful to facilitate providing casing support members at a location in which a portion of the circuit board 30 is present. A hole 92 is cut in the circuit board 30 through which a protruding portion 94 of the lower post 90b extends. In other embodiments, a portion of the upper post 90a extends through the hole 92 in the circuit board 30. A hole cannot be cut into display 24, but such two-part support members can nevertheless be provided within the display casing 21.

In some embodiments, all of the base casing support members are single posts as illustrated in FIGS. 2-4. In other embodiments, all of the support members are of the two-part type illustrated in FIG. 6. In yet other embodiments, the notebook computer 10 can include a mix of single or two-part support members.

Figure 7:
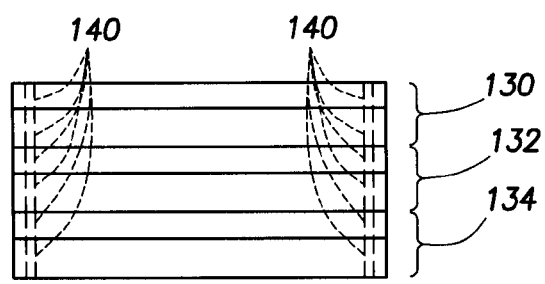
FIG. 7 illustrates multiple notebook computers in a stacked arrangement in accordance with various embodiments.

FIG. 7 illustrates a stack of closed notebook computers 130-134. The support members 140 of the base and display casings of the various notebook computers 130-134 are in substantial alignment as shown thereby strengthening the casings to accommodate the weight of the stack.

Figure 8:
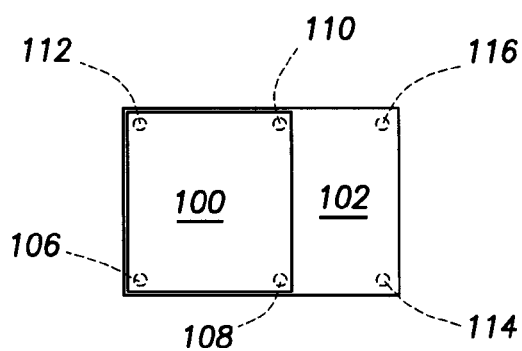
FIG. 8 illustrates two stacked notebook computers of different sizes.

FIG. 8 illustrates a top view of one notebook computer 100 stacked on top of another notebook computer 102. The displays of the notebook computers 100, 102 are closed. The upper notebook computer 100 has a smaller "footprint" than the other lower notebook computer 102. However, support members 106, 108, 110, and 112 at the corners of smaller notebook computer 100 align with corresponding support members (not specifically shown) in the larger notebook computer 102. In addition, the larger notebook computer 102 includes support members 114 and 116 at its other two corners. Thus, the larger notebook computer 102 can be located below a notebook computer of the same or different size and support members in the casings of the computers still align to support the weight as described above.

Figure 9:
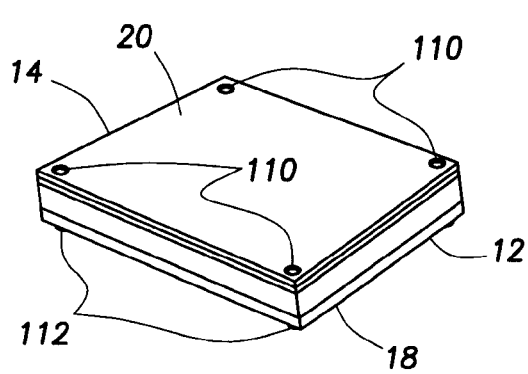
FIG. 9 illustrates features on the display and base units of the notebook computer to facilitate proper alignment of computers when stacked.

FIG. 9 illustrates an embodiment in which features are provided in the display unit 14 and base unit 12 to facilitate proper alignment of the computers when stacked to ensure the support members are substantially aligned. As shown in the example of FIG. 9, the upper portion 20 of the display unit 14 comprises one or more indentations 110. The bottom portion 18 of the base unit comprises protruding members. When two such notebook computers are stacked, the protruding members 112 of the top computer fit within the indentations 110 of the bottom computer. When the protruding members 112 are within the corresponding indentations 110, the support members of the computers will be in substantial alignment as described above. In other embodiments, the upper portion 20 of the display unit 14 may contain the protruding members and the bottom portion 18 of the base unit 12 may contain the indentations. Any number of protruding member/indentation pairs can be provided and the shape of the protruding members and indentations can be varied as desired. Any yet other embodiments, anti-skid pads (e.g., rubber pads) are provided on the lower surface of the bottom portion 18 and the support members are aligned with the anti-skid pads so that the weight of the systems when stacked are transmitted through the anti-skid pads and support members.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A notebook computer, comprising:
   a base casing;
   a display casing hingeably coupled to the base casing; and
   a plurality of support members disposed in each of said base casing and said display casing around a perimeter of said casings;
   wherein, when said display casing is closed, said support members in said display casing substantially align with said support members in said support members in said base casing.

2. The notebook computer of claim 1 wherein said base casing comprises a top portion and a bottom portion between which a circuit board is contained, and each support member in said base casing extends from said top portion to said bottom portion.

3. The notebook computer of claim 1 wherein said base casing comprises a top portion and a bottom portion between which a circuit board is contained, and each support member in said base casing extends from said top portion to said bottom portion through a hole in said circuit board.

4. The notebook computer of claim 3 wherein each support member comprises two portions, a first portion that extends away from said bottom portion of said base casing and a second portion that extends away from said top portion, and wherein at least one of said first and second portions extend through said hole.

5. The notebook computer of claim 1 wherein each support member comprises a post.

6. The notebook computer of claim 1 wherein said base casing comprises a top portion and a bottom portion, and each support member in said base casing comprises an upper member provided from said top portion and a bottom member provided from said bottom portion.

7. The notebook computer of claim 1 wherein said display casing comprises a top portion and a bottom portion between which a display is contained, and each support member in said display casing extends from said top portion to said bottom portion.

8. The notebook computer of claim 1 wherein an exposed outer surface of said display casing comprises an anti-skid pad that aligns with a support member.

9. The notebook computer of claim 1 wherein the support members in the base casing are positioned along a portion of said base casing that contacts a corresponding portion of said display casing.

10. The notebook computer of claim 1 wherein the base casing comprises a support member at each of four corners of said base casing and said display casing comprises a support member at each of four corners of said display casing.

11. The notebook computer of claim 1 wherein the display casing comprises a receiving feature that receives a corresponding feature on a bottom portion of another notebook computer in said other notebook computer is stacked on top of said display casing.

12. A notebook computer, comprising:
a display unit comprising a display casing having a top portion and a bottom portion between which a display is contained;
a base unit hingeably coupled to said display unit, said base unit comprising a base casing having a top portion and a bottom portion between which a circuit board is contained; and
a plurality of support members disposed in each of the base casing and the display casing around a perimeter of said casings, each support member extends between the top and bottom portions of the respective display or base casing;
wherein, when said display unit is closed on said base unit, said support members in said display casing substantially align with said support members in said support members in said base casing.

13. The notebook computer of claim 12 wherein said support members are posts having a substantially cylindrical cross-sectional shape.

14. The notebook computer of claim 12 wherein each support member comprise a first portion provided on one surface of a casing and a second portion provided on another surface of said casing.

15. The notebook computer of claim 12 wherein at least support member in the base casing extends through a hole in the circuit board.

16. The notebook computer of claim 12 wherein the support members are all substantially identical as for their cross-sectional shape.

17. The notebook computer of claim 12 wherein said cross-sectional shape is circular.

* * * * *